United States Patent [19]

Solomon et al.

[11] Patent Number: 4,833,128
[45] Date of Patent: May 23, 1989

[54] DIETARY SUPPLEMENT

[76] Inventors: Neil Solomon, 2209 Ken Oak Rd., Baltimore, Md. 21209; Theodore C. Solomon, 3006 Benson Mill Rd., Upperco, Md. 21155

[21] Appl. No.: 920,420

[22] Filed: Oct. 17, 1986

Related U.S. Application Data

[63] Continuation-in-part of Ser. No. 687,036, Dec. 28, 1984, abandoned.

[51] Int. Cl.$^4$ .................. A23L 1/30; A01N 37/18
[52] U.S. Cl. .................. 514/23; 514/909; 424/439; 424/442; 426/72; 426/74; 426/656; 426/658; 426/648; 426/804
[58] Field of Search ............ 514/23, 909; 424/439, 424/442; 426/72, 74, 656, 658, 648, 804

[56] References Cited

U.S. PATENT DOCUMENTS

| | | | |
|---|---|---|---|
| 3,697,287 | 10/1972 | Winitz | 426/804 |
| 3,849,554 | 11/1974 | Winitz | 426/72 |
| 4,009,265 | 2/1977 | Howard | 426/656 |
| 4,137,327 | 1/1979 | Marshall | 514/909 |
| 4,251,550 | 2/1981 | Proctor | 426/656 |
| 4,277,464 | 7/1981 | Reussner et al. | 424/49 |
| 4,298,601 | 11/1981 | Howard | 426/804 |
| 4,391,826 | 7/1983 | Mills et al. | 514/909 |
| 4,414,238 | 11/1983 | Schmidl | 426/804 |
| 4,452,880 | 6/1984 | Yamazaki et al. | 426/696 |
| 4,497,800 | 2/1985 | Larson et al. | 426/72 |
| 4,645,678 | 2/1987 | Nofre et al. | 424/48 |

FOREIGN PATENT DOCUMENTS

| | | | |
|---|---|---|---|
| 676784 | 12/1963 | Canada | 426/804 |
| 2032423 | 5/1980 | United Kingdom | 514/909 |
| 2038157 | 7/1980 | United Kingdom | 426/804 |

OTHER PUBLICATIONS

Pearson, D. et al, Life Extension, Warner Books, N.Y., 1982, pp. 251, 252, 287–290.

Smith, Gerard P.; The Place of Gut Peptides in the Treatment of Obesity; 1983; pp. 407–419; Biochemical Pharmacology of Obesity.

N. Bernardi et al; Isethionate May Not Be an Inert Substitute for, etc., Dec. 20, 1976; pp. 914–917; Experientia 33/7.

Della-Fera et al; CCK-Octapeptide Injected in DSF and Changes in Feed, etc., Dec. 20, 1979; pp. 943–950; Psysiology & Behavior, vol. 24.

G. P. Smith et al; Cholecystokinin and Satiety: Theoretic and Therapeutic, etc., 1976; pp. 349–355; Hunger: Basic Mechanisms and Clinical Implications.

J. Gibbs et al; Bombesin Suppresses Feeding in Rats; Nov. 8, 1979; pp. 208–210; Nature, vol. 282.

J. Gibbs et al; Cholecystokinin-Decreased Food Intake in Rhesus Monkeys; Jan. 1, 1976; pp. 15–18; American Journal of Physiology, vol. 230.

J. Meyer et al; Comparison of D- and L-Phyenylalanine as Pancreatic Stimulants, Apr. 1972; pp. 1058–1063; American Journal of Physiology, vol. 222, No. 4.

A. Saito et al; Cholecystokinnin Receptors in the Brain: Characterization, etc., Jun. 6, 1980; pp. 1155–1156; Science, vol. 208.

A. E. Harper; Protein and Amino Acids in the Regulation of Food Intake; 1976; pp. 103–113; Hunger: Basic Mechanisms and Clinical Implications.

Primary Examiner—Ronald W. Griffin
Attorney, Agent, or Firm—Hoffman, Wasson, Fallow & Gitler

[57] ABSTRACT

A dietary supplement formulated to suppress appetite comprising L-phenylalanine in combination with restricted quantities of protein, carbohydrate, fat and dietary fiber.

14 Claims, No Drawings

DIETARY SUPPLEMENT

RELATED APPLICATION

This application is a continuation-in-part application based upon U.S. patent application Ser. No. 687,036, filed Dec. 28, 1984, and now abandoned.

BACKGROUND OF THE INVENTION

1. Field of the Invention

The invention relates to a method and composition for the treatment of obesity. In particular, the invention relates to a method for reducing overall caloric intake comprising administering a nutritive food supplement which inhibits feeding and elicits satiety through established hormonal and neural feedback mechanisms.

2. Prior Art

The failure to control food intake in a normal manner has long been thought to be a major cause of obesity. A lack of understanding of the control mechanisms by which food intake is regulated in the normal animal or human has, however, prevented an effective clinical application of this concept.

Until quite recently, the primary physiological appetite control mechanisms were generally believed to be stimulated by an increase in blood glucose levels and/or gastric distension resulting from food intake. It is now postulated that these appetite controls are of secondary importance, and that a primary mechanism for eliciting satiety and inhibiting feeding comprises the release of peptide hormones in the small intestine on preabsorptive contact of food stimuli with mucosal gut receptors; while a number of peptide hormones may participate, the "satiety effect" (appetite suppression) of cholecystokinin (CCK) appears at this time to be particularly significant. An elaboration of the investigatory work on this hormone and a proposed elucidation of its role as an appetite suppressant is presented by G. P. Smith in *Biochemical Pharmacology of Obesity*, pp. 407–419 (Elsevier Science Publishers, 1983).

The recognition of the physiological activity of CCK and related hormones in the eliciting of satiety was followed by a recognition of the therapeutic potential of these hormones by Smith and others: Saito et al, *Science* 208: 1155–1156, 1980; Della-Fera et al, *Physiol. Behavior* 24: 943–950, 1980; Gibbs et al. *Nature* 282: 208–210, 1979; Malaisse-Lagae et al, *Experientia* 33: 915–917, 1977; Smith et al: In D. Novin et al (Eds.) *Hunger-Basic Mechanisms and Clinical Implications*, Raven, N.Y., pp. 349–355, 1976; Gibbs et al., *Am. J. Physiol* 230: 15–18, 1976; Fincham et al, *Program*, 6th Int. Conf. Phys. of Food and Fluid Intake, 1977; Meyer et al. *Am. J. Physiol.* 222: 1058–1063, 1972. Clinical applications of particular interest appear to include both the exogenous administration or inducement of endogenous release of gut peptides such as CCK. In particular, the administration of a chemical stimulus to the release of the hormone(s) of interest has been proposed, including the use of L-phenylalanine as a preabsorptive releaser of CCK (Fincham, Program, supra). It is, however, recognized (e.g., Smith, G. P., *Biochemical Pharmacology of Obesity*, supra) that the mere clinical administration of these peptides, or the clinical initiation of their release, is not, per se, an adequate treatment for obesity. [cf. Gibbs et al, *Am. J. Physiol.* 230: 15–18, 17(1976), Smith et al, *Hunger-Basic Mechanisms*, supra., p. 353.]

SUMMARY OF THE INVENTION

The invention accordingly comprises a composition for use as a dietary supplement to elicit a sensation of satiety and to inhibit feeding. The composition is administered as a preload, before a meal, and is balanced to slow emptying of the stomach into the duodenum, to cause distension of the gut, and to stimulate production of CCK at an optimum rate. These phenomena collectively and separately stimulate neural and hormonal feedback mechanisms which produce an effect of satiety and inhibit feeding. This assists the patient in exercising cognitive control over food intake during the subsequent meal. Dieting, with ensuing weight loss, is thus made easier; appropriate behavior modification is thereby encouraged so that supplement therapy may eventually be terminated while the patient continues to maintain normal eating habits.

DETAILED DESCRIPTION OF THE INVENTION

The supplement composition of the invention comprises L-phenylalanine, preferably in combination with essential amino acids, protein, carbohydrate, fat and dietary fiber. The supplement is delivered as a preload about 15–30 minutes before a meal, preferably about 20 minutes.

The composition is balanced to achieve several effects which contribute to the inhibition of feeding at the subsequent meal, rather than the nutrition of the patient. The proportions of the ingredients are thus not those of a well-balanced diet, and the supplement is preferably intended for administration in conjunction with a nutritionally balanced meal, most preferably in conjunction with a multi-vitamin and mineral composition.

The neural and hormonal feedback mechanisms induced by the supplement composition of the invention include the satiety responses induced by CCK, which is released upon stimulation with L-phenylalanine and by a reciprocal inhibition of food flow from the stomach. According to the present invention, a reduced flow from the stomach to the intestine of food from the subsequent meal is achieved by administration of the present supplement formulation, which is delivered to the intestine at a projected rate of about 2.0 to 3.0K calories per minute. The supplement generally inhibits food flow from the stomach by a rate of about 0.33 to about 0.5 minutes pe kilocalorie; this reciprocal inhibition of food from the subsequent meal complements the gut distension caused by food bulk experienced on ingestion of the meal, and results in an enhanced satiety response. Surprisingly, the satiety response to CCK does not appear to be adversely affected by the presence of the other supplemental ingredients. While the degree of satiety response attributable to each of the mechanisms involved cannot be accurately measured, the combined effect of the supplement components on inducement of satiety and consequent weight loss is excellent.

In one experiment of 100 obese patients who followed the same regimen, as compared to another 100 patients used as a control, the median weight loss was at least 3 times greater in the treatment group than in the control group. The failure rate (patients who gained rather than lost weight) was 6 times greater in the control group than in the treatment group; see Example III, infra.

Food supplement compositions according to the present invention include those wherein the ingredients are present in the following preferred proportions (percentages are percent by wt. of total composition excluding L-phenylalanine):

Protein 25–40%
  Carbohydrate 50–60%
  Fat 2–5%
  Dietary Fiber 5–8%
  L-Phenylalanine to deliver from about 700–800 mgs. per serving Preferably, the protein is derived from sources of vegetable or dairy protein, and most preferably comprises soy protein and/or non-fat dry milk. Suitable sources of carbohydrate include sugars and/or starches; sucrose and cornstarch are exemplary carbohydrates. Preferred fats include unsaturated fats such as sunflower oil, safflower oil, or corn oil, and desirably includes some linoleic acid. Conventional sources of dietary fiber include cellulose fiber. Most preferably, the composition includes additional essential amino acids, particularly valine, methionine, and tryptophan, as well as the essential minerals phosphorous and calcium, conveniently in the form of dipotassium phosphate and calcium chloride. Sweeteners, thickeners, preservatives, and coloring and flavoring agents may be included as desired. The formulation is adjusted to deliver from about 134–150 calories per serving. An exemplary dry supplement formulation comprises about 35 wt % protein, 56 wt % carbohydrate, 3 wt % fat, 6 wt % dietary fiber, plus sufficient L-phenylalanine to deliver about 700 mgs. per serving. Customary dosages comprises from about 30 to 37 grams of this formulation delivering about 134 to 140 calories, to be administered before each of three meals per day; each serving preferably delivers about 700 to 800 mgs. L-phenylalanine. For palatability, the dry supplement may be formulated into a shake by vigorously admixing the supplement with water, especially by blending the supplement with water and ice cubes in a blender at high speed in a well-known manner.

As previously noted, the supplement contains ingredients which are not nutritionally balanced. Therefore, in addition to nutritionally balanced meals of restricted caloric intake, it is recommended that a complete vitamin and mineral supplement, usually in capsule form, be taken with the supplement or meal.

The supplement is non-toxic, palatable, and well-tolerated by most patients; phenylketonuria may be a contraindication. The suggested regimen of three servings per day, 20 minutes before each meal may be continued indefinitely, but it is much preferred that the patient be taught compensatory behavioral modification so that the supplement may be eventually eliminated from the maintenance diet.

It is noted that, while theoretical mechanisms have been suggested, it is not certain by what physiological route or routes the effects of the present supplement are achieved. It is in fact possible that additional gut hormones eliciting a satiety response are stimulated by the supplement, or that the combination of ingredients elicits an enhanced or synergistic response. The results obtained according to the present invention are, however, unexpected in view of prior art knowledge.

The following Examples illustrate the practice of the invention:

EXAMPLE I

A dry food supplement according to the invention was prepared by combining the following ingredients:

| Ingredient | Amount (Gms) |
| --- | --- |
| Non-Fat Dry Milk | 12 |
| Calcium Caseinate | 7 |
| Soy Protein Isolate | 1.5 |
| Sucrose | 8 |
| Karaya Gum | 1.4 |
| Cornstarch | 1.0 |
| Safflower Oil | 0.9 |
| Dipotassium Phosphate | 0.67 |
| Cellulose Gum | 0.22 |
| L-Phenylalanine | 0.70 |
| Valine* | 0.60 |
| Calcium Chloride | 0.15 |
| Aspartame | 0.12 |
| Methionine | 0.12 |
| Sodium Alginate | 0.05 |
| Tryptophan* | 0.15 |
| Natural and Artificial Flavors | 0.17 |

*The essential amino acids valine and tryptophan are not added separately in this Example, but are present in the amounts specified as constituents of the various ingredients.

34 gms. of this supplement delivered 134 calories, and contained 12 gm protein, 19 gm carbohydrate, 1 gm fat, and 2 gm dietary fiber.

EXAMPLE II 34 gms. of the supplement prepared according to Example I were vigorously combined with 10 oz. water; the product shake represented a single serving of the supplement.

EXAMPLE III

Each of 100 obese patients in a treatment group received a single serving of supplement according to Example II 20 minutes before each meal of restricted caloric intake, together with a complete multi-vitamin and mineral tablet, for a one month trial period. Three meals per day for a total of 2500 calories per day were prescribed. A control group of 100 obese patients was placed on the same regimen, except that the supplement was excluded from the diets. (The control and treatment groups were compiled by random division of a group of 200 obese patients.)

Nearly one-half (48) of the patients in the treatment group lost 7 or more pounds during the trial period, while only 2 patients in the control group lost 7 or more pounds in the same period. Median weight loss in the treatment group over the trial period was between 6 and 7 pounds, while median weight loss in the control group was between 1 and 2 pounds over the same period. Three patients in the treatment group and eighteen patients in the control group registered a gain in weight during the trial period.

Discussions with the patients elicited the conclusion that, in the absence of the supplement according to the invention, patients in the control group were not satiated and ingested the maximum calories permitted, and in some instances, exceeded the prescribed caloric intake by "cheating" on the diet, whereas the patients whose diet included the supplement felt satiated, and ingested less than the prescribed caloric intake.

EXAMPLE IV

Each of 15 obese patients in a treatment group received a single serving of supplement according to Example II 20 minutes before each meal of restricted caloric intake for a one-week trial period. Three meals per day for a total of 2500 calories per day were prescribed. A control group of 15 obese patients were placed on the same regimen, except that L-phenlyalanine alone the same amount as present in the supplement was substituted for the supplement. Men and women were substantially equally distributed in each group.

A. After one week, the following weight loss in each of the groups was measured:

| Treatment Group | | Control Group |
| --- | --- | --- |
| Mean Weight Loss | 0.82 | — |
| Mean Weight Gain | — | 0.58 |
| Median Weight Loss | 1.1 | — |
| Median Weight Gain | — | 0.25 |

B. Both the treatment group and the control group were asked to evaluate satiety levels experienced over the trial week on a scale of 1 to 10 (10=complete satiety, 1=complete lack of satiety), the following levels were reported:

| Treatment Group | | Control Group |
| --- | --- | --- |
| Mean Satiety Level: | 6.133 | 3.066 |
| Median Satiety Level: | 7.00 | 7.000 |

C. The patients in both the treatment and control groups were asked to keep diaries of their caloric intake over the trial period; the following caloric intake was reported:

| Treatment Group | | Control Group |
| --- | --- | --- |
| Mean Calories/Week | 2024.6 | 2566.8 |
| Median Calories/Week | 1936.0 | 2502.0 |

As is apparent, a significantly greater weight loss in the obese patients was achieved with the supplement of the invention in contrast to an actual weight gain measured in the obese patients who received L-phenylalanine alone. This result is consistent with reports in the literature which suggest that the appetite suppression effect of CCK may be merely temporary, followed by a "rebound" effect with accompanying excessive increase in appetite and concomitant weight gain, or a limited satiety effect (cf. Smith et al, *CCK and Satiety*, 319-355,353, of record in the parent application).

What is claimed is:

1. A dietary supplement for administration to a mammal prior to a meal as a preload unit to induce satiety and inhibit feeding consisting essentially of L-phenylalanine and from about 25-40 wt % protein, from about 50-60 wt % carbohydrate, from about 2-5 wt % fat, and from about 5-8 wt % dietary fiber, said supplement being balanced so that each preload unit thereof delivers at least about 700 mg. L-phenylalanine and contains fewer than about 140 calories.

2. The supplement of claim 1, wherein each preload unit delivers from about 700 to 800 mg. L-phenylalanine and from about 134 to 140 calories.

3. The supplement of claim 2, wherein the preload is balanced so that each preload unit reciprocally inhibits food flow from the stomach after said meal by a rate of from about 0.33 to about 0.5 minutes per kilocalorie.

4. The supplement of claim 1, wherein each preload unit is from about 30-37 grams.

5. The supplement of claim 4, wherein the protein, carbohydrate, fat, and dietary fiber are derived from:
   (a) a combination of vegetable and dairy proteins comprising non-fat dry milk, caseinate, and soy protein;
   (b) a combination of sugars and starches comprising a sugar and cornstarch;
   (c) one or more unsaturated fats comprising sunflower oil, safflower oil and corn oil; and
   (d) a combination of dietary fibers comprising cellulose fiber, karaya gum, and sodium alginate.

6. The supplement of claim 5, wherein the sources of protein, carbohydrate, fat, and dietary fiber are present in about the following amount, based on a 34 gram preload unit:

| INGREDIENT | GRAMS |
| --- | --- |
| non-fat dry milk | .12 |
| caseinate | .7 |
| soy protein | 1.5 |
| sugar | .8 |
| cornstarch | 1.0 |
| unsaturated fat | 0.9 |
| cellulose gum | 0.22 |
| karaya gum | 1.4 |
| sodium alginate | 0.05 |

7. The supplement of claim 1, consisting of no less than 25 wt. % protein, 50 wt. % carbohydrate, 2 wt. % fat, and 5 wt. % dietary fiber.

8. A method for treating obesity in mammals comprising administering a dietary supplement to said mammal prior to a meal as a preload unit to induce satiety and inhibit feeding, wherein the supplement consists essentially of L-phenylalanine and from about 25-40 wt % protein, from about 50-60 wt % carbohydrate, from about 2-5 wt % fat, and from about 5-8 wt % dietary fiber and is balanced so that each preload unit thereof delivers at least about 700 mg. L-phenylalanine and contains fewer than about 140 calories.

9. The method of claim 8, wherein each preload unit contains about 35 wt % protein, 56 wt % carbohydrate, 3 wt % fat and 6 wt % dietary fiber.

10. The method of claim 8, wherein the supplement is administered as a preload unit of from about 30-37 rams to a human at least about 15 minutes before each of three meals per day.

11. The method of claim 8, wherein the supplement is prepared in dried form and is vigorously combined with water prior to administration to form a shake.

12. The method of claim 8, wherein the supplement delivers from about 134 to 140 calories in each administration.

13. The method of claim 8, wherein the supplement is administered in dosage amounts of about 30 to 37 grams.

14. The method of claim 8, wherein the preload is balanced so that each preload unit reciprocally inhibits food flow from the stomach after said meal by a rate of from about 0.33 to about 0.5 minutes per kilocalorie.

* * * * *